United States Patent
Choi et al.

(10) Patent No.: US 10,348,617 B2
(45) Date of Patent: Jul. 9, 2019

(54) SYSTEM AND METHOD FOR STABILIZING A BACNET MSTP NETWORK WHEN FAILURES OCCUR

(71) Applicant: Siemens Schweiz AG, Zürich (CH)

(72) Inventors: William Choi, Lake Zurich, IL (US); Timothy Stevens, Antioch, IL (US)

(73) Assignee: SIEMENS SCHWEIZ AG, Zürich (CH)

( * ) Notice: Subject to any disclaimer, the term of this patent is extended or adjusted under 35 U.S.C. 154(b) by 168 days.

(21) Appl. No.: 15/683,076

(22) Filed: Aug. 22, 2017

(65) Prior Publication Data

US 2018/0375757 A1    Dec. 27, 2018

Related U.S. Application Data

(60) Provisional application No. 62/523,034, filed on Jun. 21, 2017.

(51) Int. Cl.
*H04L 12/24* (2006.01)
*H04L 12/26* (2006.01)
(Continued)

(52) U.S. Cl.
CPC ........ *H04L 45/28* (2013.01); *H04L 12/40084* (2013.01); *H04L 12/417* (2013.01);
(Continued)

(58) Field of Classification Search
CPC ..... H04L 45/28; H04L 43/10; H04L 41/0654; H04L 61/2007; H04L 61/6002;
(Continued)

(56) References Cited

U.S. PATENT DOCUMENTS

2006/0274745 A1*  12/2006  Wang .................... H04L 12/462
                                                              370/389
2009/0287736 A1*  11/2009  Shike .................... H04L 12/417
(Continued)

FOREIGN PATENT DOCUMENTS

WO    2007143554 A2    12/2007
WO    2016165981 A1    10/2016

OTHER PUBLICATIONS

PCT International Search Report and Written Opinion of International Searching Authority dated Sep. 11, 2018 corresponding to PCT International Application No. PCT/EP2018/064916 filed Jun. 6, 2018.

*Primary Examiner* — Redentor Pasia

(57) ABSTRACT

A system and method is provided for stabilizing a BACnet MSTP network when failures occur. The system may include at least one processor in an MSTP device configured via executable instructions included in at least one memory to communicate data expecting reply (DER) messages for field devices (e.g., HVAC, lighting, shading) onto an MSTP network for receipt by at least one IP device on an Ethernet network connected to the MSTP network via a BACnet IP/MSTP router. The processor may be configured to determine when the at least one IP device sent a DER message has become a non-communicative device. Also the processor may be configured to send a Poll for Master (PFM) message to the determined non-communicative device. In addition, the processor may be configured to drop further DER messages to the determined non-communicative device responsive to an absence of receipt of a response to the PFM message.

20 Claims, 6 Drawing Sheets

(51) Int. Cl.
*H04L 12/40* (2006.01)
*H04L 29/12* (2006.01)
*H04L 12/417* (2006.01)
*H04L 12/703* (2013.01)
*H04L 12/911* (2013.01)

(52) U.S. Cl.
CPC .......... *H04L 41/0654* (2013.01); *H04L 43/10* (2013.01); *H04L 47/746* (2013.01); *H04L 47/822* (2013.01); *H04L 61/2007* (2013.01); *H04L 61/6022* (2013.01); *H04L 2012/4026* (2013.01)

(58) Field of Classification Search
CPC ................. H04L 47/822; H04L 47/746; H04L 12/40084; H04L 12/417
See application file for complete search history.

(56) References Cited

U.S. PATENT DOCUMENTS

2009/0312853 A1* 12/2009 Kore .................. G05B 19/4185
 700/90
2018/0109398 A1* 4/2018 Zotti ..................... H04L 12/413

\* cited by examiner

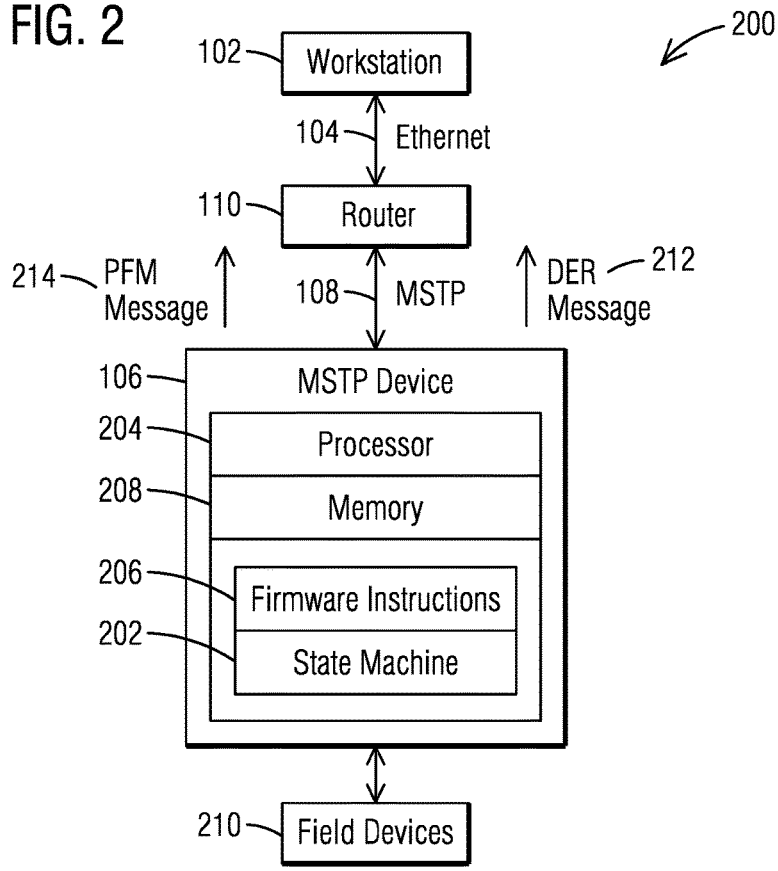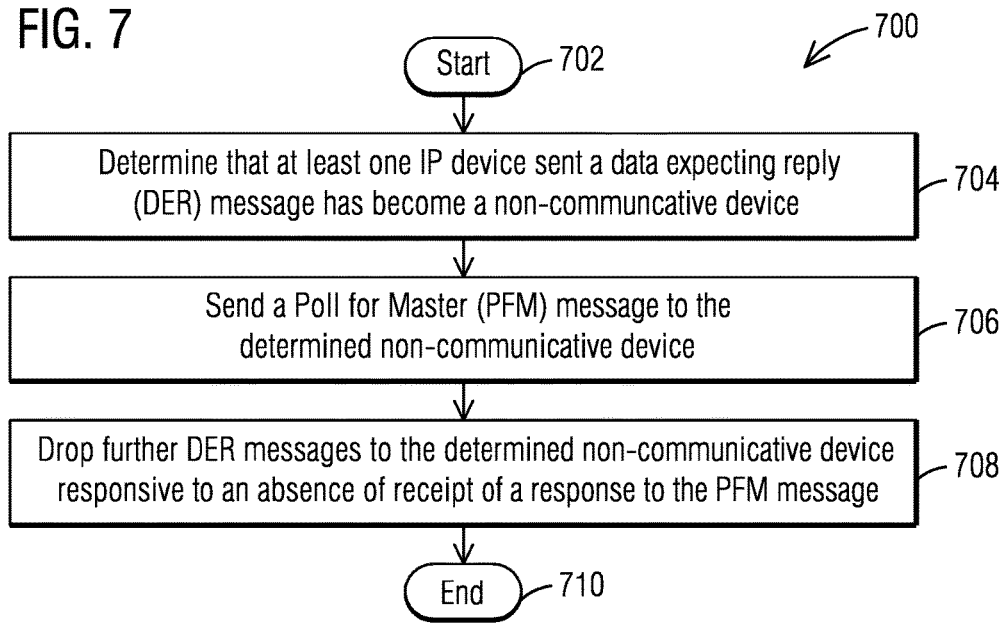

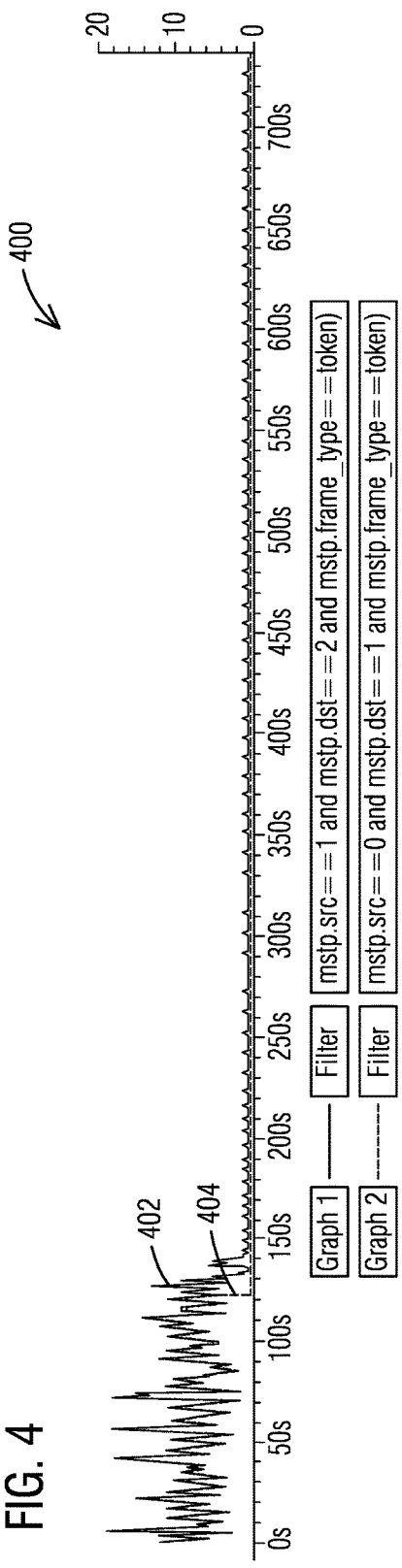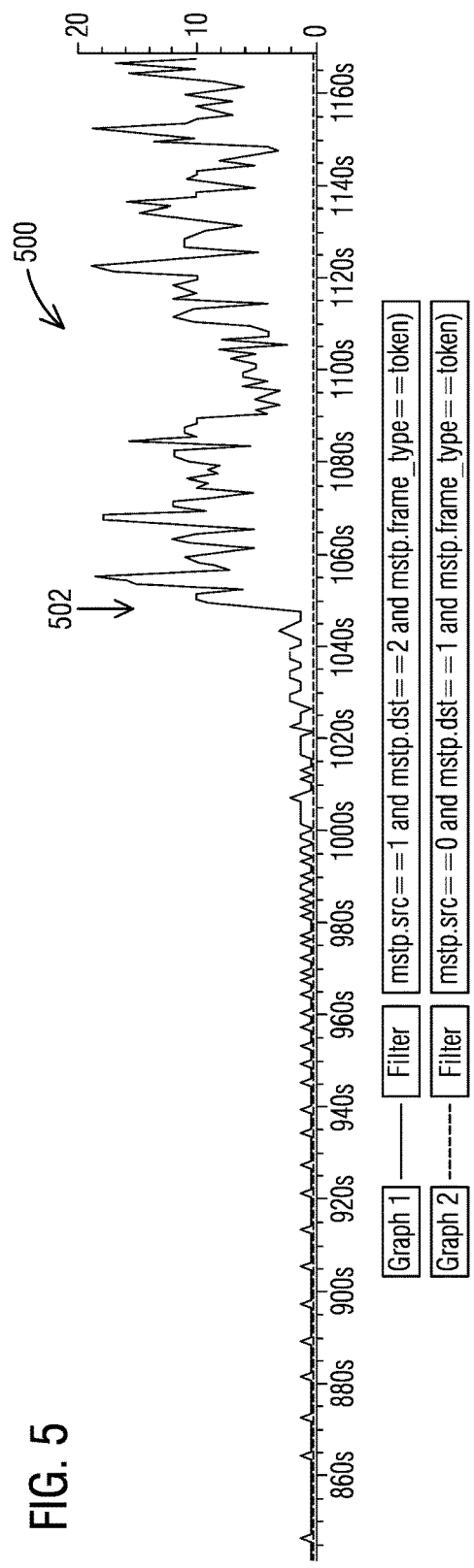

… (1) …

SYSTEM AND METHOD FOR STABILIZING A BACNET MSTP NETWORK WHEN FAILURES OCCUR

TECHNICAL FIELD

The present disclosure is directed, in general, to building automation systems that are used to control devices in a building such as HVAC equipment, blind actuators, and lighting actuators.

BACKGROUND

Building automation systems provide communication between and control of devices in a building. Such systems may benefit from improvements.

SUMMARY

Variously disclosed embodiments include building automation systems and methods that may be used to facilitate stabilizing a BACnet MSTP network when failures occur. In one example, a system may comprise at least one processor in an MSTP device configured via executable instructions included in at least one memory to communicate data expecting reply (DER) messages for field devices onto an MSTP network for receipt by at least one IP device on an Ethernet network connected to the MSTP network via a BACnet IP/MSTP router. The at least one processor may be configured to determine when the at least one IP device sent a DER message has become a non-communicative device. Also, the at least one processor may be configured to send a Poll for Master (PFM) message to the determined non-communicative device. In addition, the at least one processor may be configured to drop further DER messages to the determined non-communicative device responsive to an absence of receipt of a response to the PFM message.

In another example, a method for stabilizing a BACnet MSTP network when failures occur may comprise acts carried out through operation of at least one processor that correspond to the functions for which the previously described at least one processor is configured to carry out.

A further example may include a non-transitory computer readable medium encoded with executable instructions (such as a software/firmware component on a storage device) that when executed, causes the devices to carry out this described method.

Another example may include a product or apparatus including at least one hardware, software, and/or firmware based processor, computer, component, controller, means, module, and/or unit configured for carrying out functionality corresponding to this described method.

The foregoing has outlined rather broadly the technical features of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiments disclosed as a basis for modifying or designing other structures for carrying out the same purposes of the present disclosure. Those skilled in the art will also realize that such equivalent constructions do not depart from the spirit and scope of the disclosure in its broadest form.

Also, before undertaking the Detailed Description below, it should be understood that various definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

FIG. 2 illustrates a functional block diagram of an example system that facilitates stabilizing a BACnet MSTP network when failures occur.

FIGS. 4 and 5 illustrate graphs of DER message passes for a test of a standard MSTP state machine when a router is disconnected.

FIG. 7 illustrates a flow diagram of an example methodology that facilitates stabilizing a BACnet MSTP network when failures occur.

DETAILED DESCRIPTION

Figure 1:
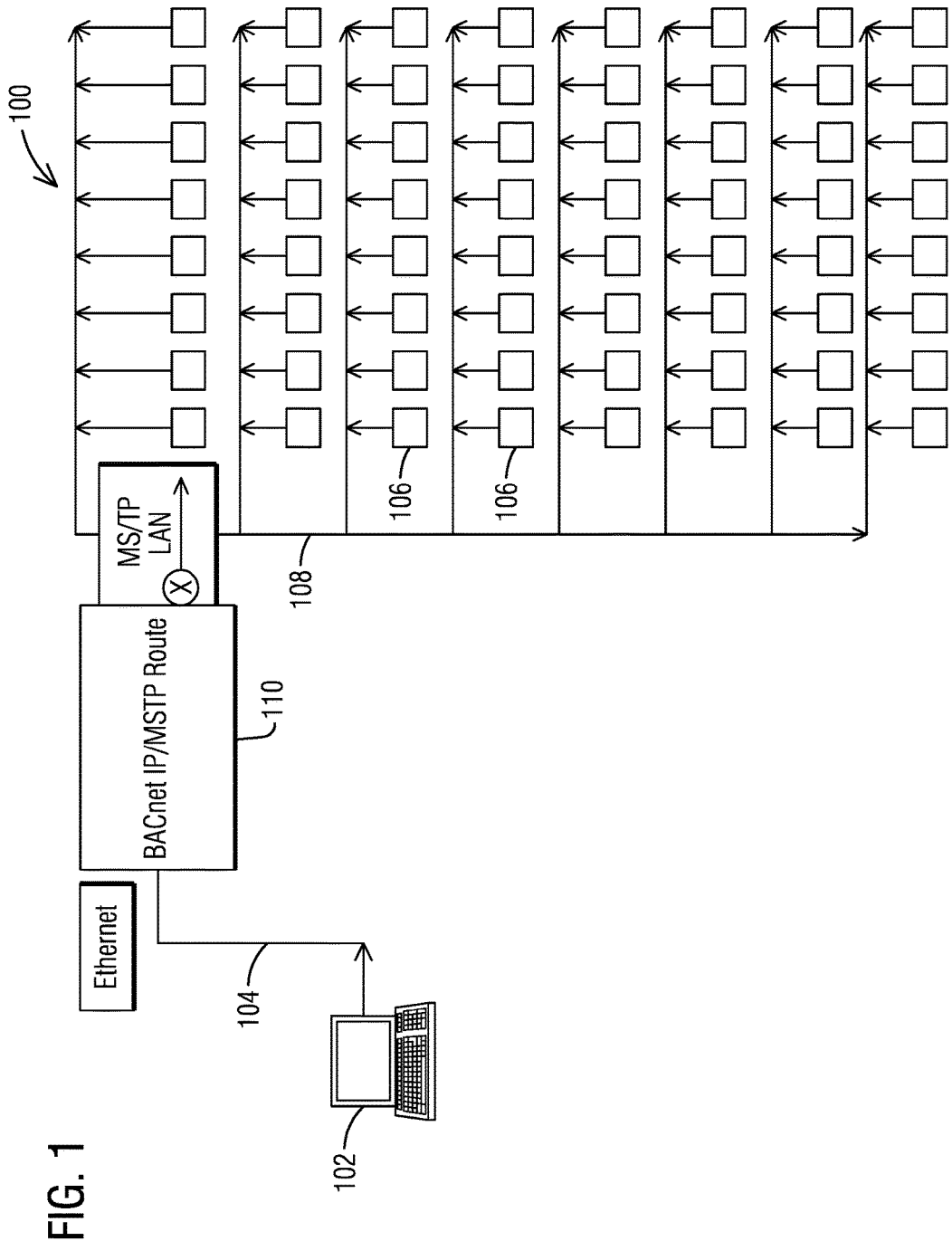
FIG. 1 illustrates a functional block diagram of a building automation system.

Various technologies that pertain to systems and methods that facilitate stabilizing a BACnet MSTP network when failures occur will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

When a critical communication connection fails on BACnet MS/TP (Building Automation and Control—Master-Slave/Token-Passing) network, the network begins to degrade and becomes unstable. This will become more prevalent on larger MSTP networks (>32 devices). The number of messages that expect a reply ("Data Expecting Reply" type of messages) slows down the token rotation of the network causing a cascading network failure.

For example, as shown in FIG. 1, an example network topology of a building automation system 100 may include a BACnet operator workstation 102 on an Ethernet network 104 that communicates with a plurality of BACnet MSTP devices 106 (referred to herein as MSTP devices) on a MSTP network (RS485) 108. Communication between the MSTP network 108 and the BACnet (IP Ethernet) network may be facilitated by a BACnet IP/MSTP router 110.

An example of such MSTP devices may include an MSTP room controller such as a Siemens DXR2.M room automation station provided by Siemens Switzerland Ltd, of Zug, Switzerland. As illustrated in the example 200 of FIG. 2, an MSTP device 106 may include a state machine 202 (e.g., a component/application) executed by a processor 204 via accessing firmware/software executable instructions 206 from a memory 208. Such a state machine 202 facilies communication of messages between a BACnet MSPT network 104, 108 and building technology field devices 210 such as HVAC, lighting, shading equipment (actuators, sensors) that are connected to ports of the MSTP device (or via a KNX PL-Link bus). Examples of messages communicated to the workstation from the MSTP devices include: change of value (COV) notifications; alarm notifications; read and write services; and confirmed private Services.

If an IP device such as a router 110 or other network component fails (e.g., breaks down, becomes disconnected, and/or is powered off), the MSTP devices 106 will continue to attempt to communicate to the workstation 102 by sending a "data expecting reply" (DER) message 212 to the failed device 110. Large numbers of MSTP devices (e.g., 32-64) contemporaneously attempting to communicate DER messages 212 may cause irreparable network instability to the MSTP network 108 via increased token rotation and multiple retries of messages, leading to a cascading failure.

For example, when a critical communication device such a router 110 fails, the token rotation can be 20 seconds or more in duration (benchmarked at 76800 baud). When the token rotation gets too large, the network will have a cascading failure sequence and devices will no longer reliably communicate with each other. Application messages to be transmitted may be 20-30 seconds stale in the device due to the large token rotation time. In addition, applications will start to retry messages due to the client transaction timeouts adding to the overhead on the network and work that must be transmitted on each token hold time. In large systems the network may not fully recover without manual intervention, due to this outage.

An example embodiment may be configured to extend an MSTP state machine 202 in the MSPT devices 106 to allow the MSTP state machine to quickly identify devices (e.g., workstation 102) that are not communicating correctly on the network and to throw away DER messages 212 when that state is identified. To accomplish this functionality, the algorithm of the standard MSTP state machine (e.g., see the MSTP datalink section of the BACnet specification) may be adapted to include additional steps/functionality. For example, the state machine algorithm may be adapted to track the state of communication to each "Master" MAC address that receives a DER message. When a DER frame times out, the system may be configured to identify that MAC address as "noncommunicative" and take further actions which limit network problems.

Figure 3:
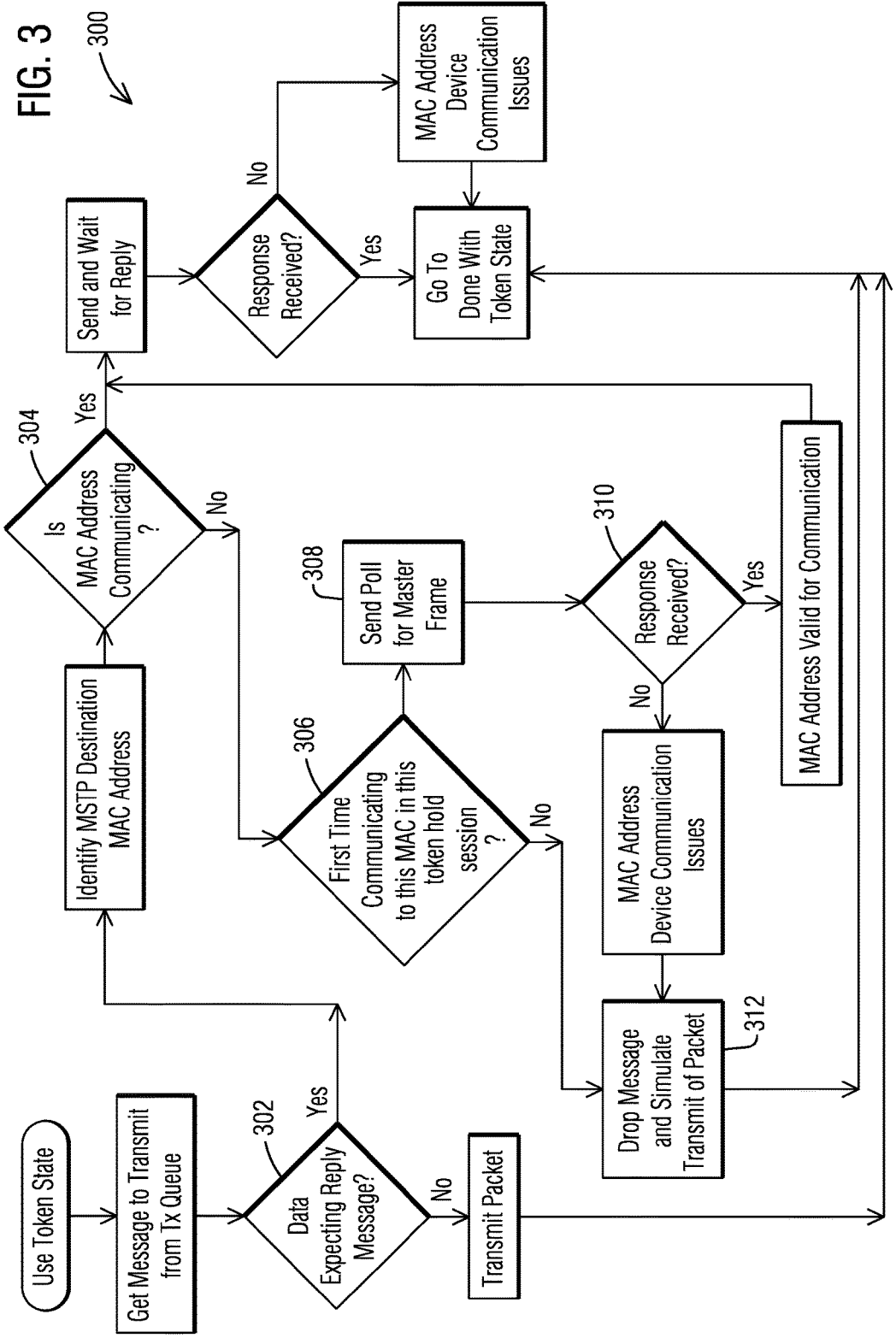
FIG. 3 illustrates a block diagram of an example embodiment of an MSTP state machine algorithm.

FIG. 3 illustrate a flow chart 300 in FIG. 3 of the enhancements to an MSTP state machine algorithm. In this example, the MSTP state machine may be configured such that on each token hold, if there is a DER message pending (at block 302) and the MAC address was previously identified as being "non-communicative" (at block 304), the MSTP state machine may send a "Poll for Master" (PFM) message 214 (at block 308) to quickly identify if that MAC address is now working.

For example, if the message is a DER message, the MSTP state machine may be configured to check the state of the MAC address for the device being sent the DER message in order to identify that this MAC address is currently not communicating (at block 304) and is in a token hold session. If the indication is that a timeout occurred previously (at block 306), the system may be configured to send the PFM message 308 to see if the MAC address is now communicating. Absent an outage, in example embodiments, "master" devices are configured to send the first octet of the frame within 15 ms. The determination of receipt of this response message may be used to verify that a MAC address can be sent the DER frame.

If a response is received from the master MAC address (at block 310), the MSTP state machine may be configured to determine that the MAC address is now communicating and cause the state machine to work as originally defined for a standard MSTP device.

However, if no response is received from the Poll for Master message (at block 310), the DER message to be sent will be dropped and not transmitted on the RS485 network (at block 312).

For each token hold, the MSTP state machine will test each MAC only once for the Poll for Master sequence (blocks 308 and 310). When multiple DER messages are found to be sent to a failed MAC address, the first DER frame will be verified with a PFM message (at block 308) and from that point on, the determination of subsequent messages in this MAC address in this token hold session (at block 306), will just be dropped (at block 312) as if the MSTP state machine had transmitted them (i.e., the MSTP state machine may be configured to simulate the transmittal of the dropped message). For example, the MSTP state machine may be configured to follow the max info frames rules, regardless if the DER message is discarded or transmitted.

Additional functionality may also be provided to handle slave devices. For example, slave devices within the "Master" address range, may be handled so that if they are found to be "noncommunicative" they are attempted with the DER Message at periodic intervals.

In this described example, when a critical IP device fails on the network, the network will recover immediately and continue to communicate messages on the MSTP network (other than to the failed IP device). The use of the "Poll for Master" message may significantly reduce the time needed to wait for an unresponsive device as well as facilitate when to begin dropping DER messages. As a result, the described functionality enables large MSTP networks to be built, which saves in costs in engineering a jobsite and reduces the number of routers required.

Figure 6:
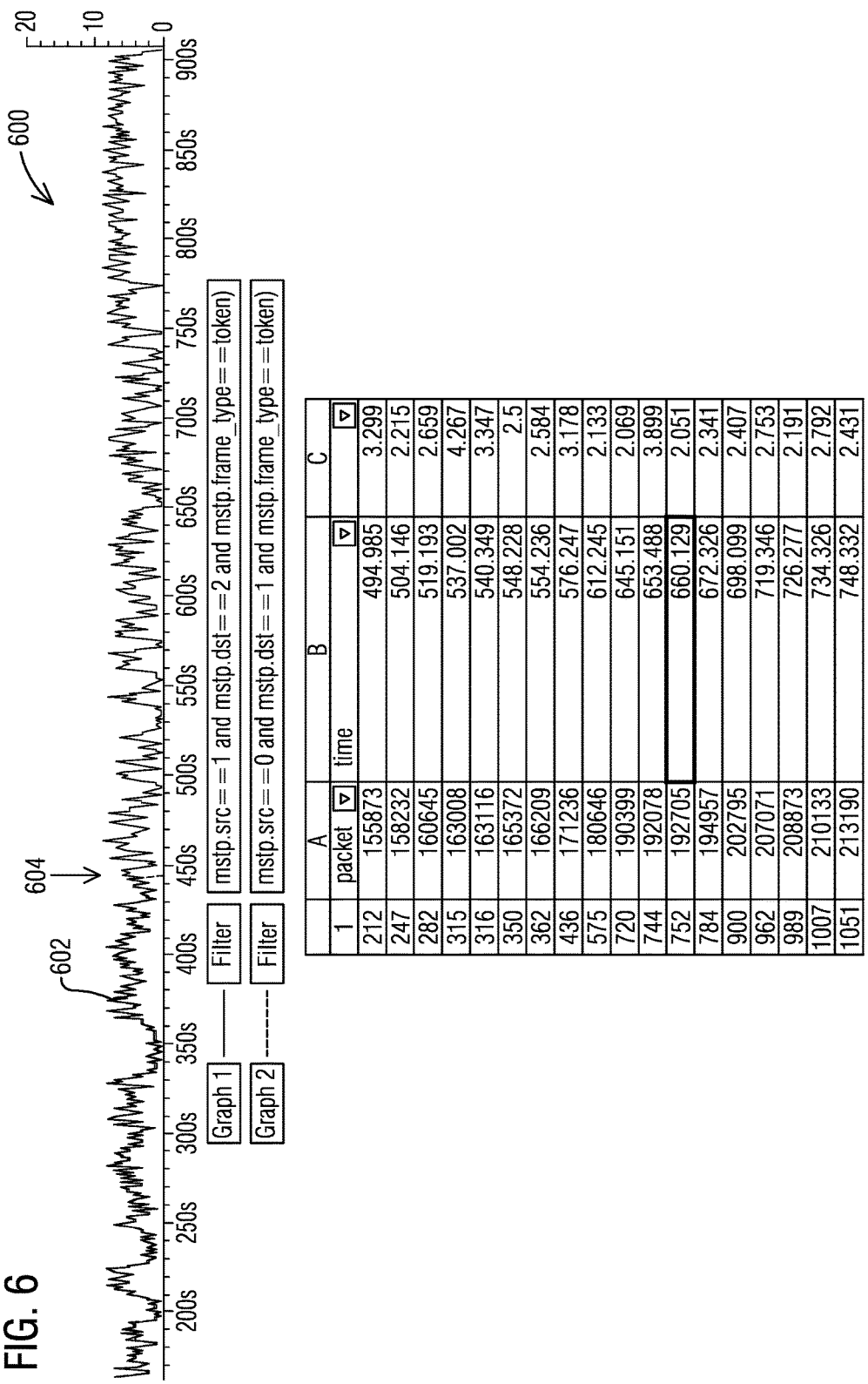
FIG. 6 illustrates a graph of DER message passes for a test of an example embodiment of an enhanced MSTP state machine when a router is disconnected.

FIGS. 4-6 illustrate test results for an MSTP state machine without and with this described functionality. Test #1 illustrates a router failure without the described enhanced MSTP state machine algorithm being carried out by an MSTP state machine. Test #2 illustrates a router failure with the described enhanced MSTP state machine algorithm being carried out by an MSTP state machine. It should be noted that the message traffic in these tests are not equivalent. Test #1 had less network load through the IP/MSTP router and test#2 had more traffic thru the IP/MSTP router.

Test #1 corresponds to use of a standard MSTP state machine in a plurality of MSTP devices arranged such as shown in FIG. 1. FIG. 4 illustrates a graph 400 that shows the frequency of the token pass (black/darker line) 402 for the standard MSTP state machine. The vertical portion of the (lighter) line 404 (at about t1=121 s) indicates when the router was disconnected from the MSTP network. In this example there are 64 MSTP devices with the standard MSTP stage machine communicating at a baud rate of 76800. All 64 MSTP devices are communicating to an IP device (e.g., a workstation) on the other side of the router.

After the router is disconnected, the number of DER messages that have a destination through the router immediately degrade the MSTP network, resulting in a significant delay before the system stabilizes (show at position 502 in the graph 500 in FIG. 5), where token rotation increases to 6-10 seconds and peaks at 20 seconds. As illustrated in FIGS. 4 and 5, the network was unstable for about 15 minutes in this test.

Test #2 corresponds to use of an enhanced MSTP state machine (carrying out the previously described algorithm shown in FIG. 3) in a plurality of MSTP devices arranged such as shown in FIG. 1. FIG. 6 illustrates a graph 600 that shows the frequency of the token pass (black/darker line) 602 for the enhanced MSTP state machine. In this test, the router was disconnected at t1=443 seconds 604. The graph shows a minimal disturbance of the network when the router is removed. With the new algorithm, the token pass does not degrade for long durations. A typical worst case scenario may be 3-4 seconds, but such durations are relatively short compared to the approximately 15 minute delay illustrated in FIGS. 4 and 5 for a standard state machine.

Referring now to FIG. 7, a methodology 700 is illustrated that facilitates stabilizing a BACnet MSTP network when failures occur. While the methodology is described as being a series of acts that are performed in a sequence, it is to be understood that the methodology may not be limited by the order of the sequence. For instance, unless stated otherwise, some acts may occur in a different order than what is described herein. In addition, in some cases, an act may occur concurrently with another act. Furthermore, in some instances, not all acts may be required to implement a methodology described herein.

The methodology may start at 702 and may include several acts carried out through operation of at least one processor in an MSTP device configured via executable instructions included in at least one memory to communicate data expecting reply (DER) messages for field devices onto an MSTP network for receipt by at least one IP device on an Ethernet network connected to the MSTP network via a BACnet IP/MSTP router. These acts may include an act 704 of determining that the at least one IP device sent a DER message has become a non-communicative device. Also these acts may include an act 706 of sending a Poll for Master (PFM) message to the determined non-communicative device. In addition, these acts may include an act 708 of dropping further DER messages to the determined non-communicative device responsive to an absence of receipt of a response to the PFM message. At 710 the methodology may end.

Also, it should be appreciated that this described methodology may include additional acts and/or alternative acts corresponding to the features described previously with respect to the MSTP device 106 and network topology 100.

For example, the methodology may include an act of determining that a first DER message has not received a corresponding reply communication from a MAC address associated with the at least one IP device; and an act of sending the PFM message responsive to receiving a second DER message for the same MAC address.

In addition, responsive to receiving a third DER message for the same MAC address after the PFM message was sent, the methodology may include an act of dropping the third DER message without sending the PFM message.

As discussed previously, the executable instructions may correspond to firmware (or portions thereof) that correspond to an MSTP state machine when executed by the at least one processor in an MSTP device. In addition, this described method may be carried out by a plurality of MSTP devices connected to respective field devices and connected to a common MSTP network connected via the BACnet IP/MSTP router to the at least one IP device having the MAC address on the Ethernet network.

In example embodiments, the methodology may include controlling the field devices responsive to communications received through the MSTP network. As discussed previously, the field devices connected to the MSTP device may correspond to at least one of HVAC, lighting, and/or shading equipment.

The described methodology may also include acts of simulating transmittal of the dropped messages; determining when communications are restored to the at least one IP device; and communicating DER messages to the IP device when communications are determined to be restored to the at least one IP device.

As discussed previously, acts associated with the above-described methodologies (other than any described manual acts) may be carried out by one or more processors 204 included in an MSTP device 106 or any other type of data processing systems with corresponding functionality. Such processor(s) may execute from at least one memory 208 executable instructions 206 (such as software/firmware instructions) that are operative to cause the described acts/functions to be carried out by the one or more processors.

Also, as used herein a processor corresponds to any electronic device that is configured via hardware circuits, software, and/or firmware to process data. For example, processors described herein may correspond to one or more (or a combination) of a microprocessor, CPU, or any other integrated circuit (IC) or other type of circuit that is capable of processing data in a data processing system. It should be understood that a processor that is described or claimed as being configured to carry out a particular described/claimed process or function may: correspond to a CPU that executes computer/processor executable instructions stored in a memory in the form of software and/or firmware to carry out such a described/claimed process or function; and/or may correspond to an IC that is hard wired with processing circuitry (e.g., an FPGA or ASIC IC) to carry out such a described/claimed process or function.

It should also be understood that a processor that is described or claimed as being configured to carry out a particular described/claimed process or function may correspond to the combination of the processor with the software/firmware instructions loaded/installed into the described memory (volatile and/or non-volatile), which are currently being executed and/or are available to be executed by the processor to cause the processor to carry out the described/claimed process or function. Thus, a processor that is powered off or is executing other software/firmware, but has the described software/firmware instructions installed on a storage device in operative connection therewith (such as in a nonvolatile memory) in a manner that is setup to be executed by the processor (when started by a user, hardware and/or other software), may also correspond to the described/claimed processor that is configured to carry out the particular processes and functions described/claimed herein.

Further the phrase "at least one" before an element (e.g., a processor) that is configured to carry out more than one function/process may correspond to one or more elements (e.g., processors) that each carry out the functions/processes and may also correspond to two or more of the elements (e.g., processors) that respectively carry out different ones of the one or more different functions/processes.

It is important to note that while the disclosure includes a description in the context of a fully functional system and/or a series of acts, those skilled in the art will appreciate that at least portions of the mechanism of the present disclosure and/or described acts are capable of being distributed in the form of computer/processor executable instructions (e.g., the described software and/or firmware instructions) contained within a non-transitory machine-usable, computer-usable, or computer-readable medium in any of a variety of forms, and that the present disclosure applies equally regardless of the particular type of instruction or data bearing medium or storage medium utilized to actually carry out the distribution. Examples of non-transitory machine usable/readable or computer usable/readable mediums include: ROMs, EPROMs, magnetic tape, hard disk drives, SSDs, flash memory, CDs, DVDs, and Blu-ray disks. The computer/processor executable instructions may include a routine, a sub-routine, programs, applications, modules, libraries, and/or the like. Further, it should be appreciated that computer/processor executable instructions may correspond to and/or may be generated from source code, byte code, runtime code, machine code, assembly language, Java, JavaScript, Python, C, C#, C++ or any other form of code that can be programmed/configured to cause at least one processor to carry out the acts and features described herein. Still further, results of the described/claimed processes or functions may be stored in a computer-readable medium, displayed on a display device, and/or the like.

Figure 8:
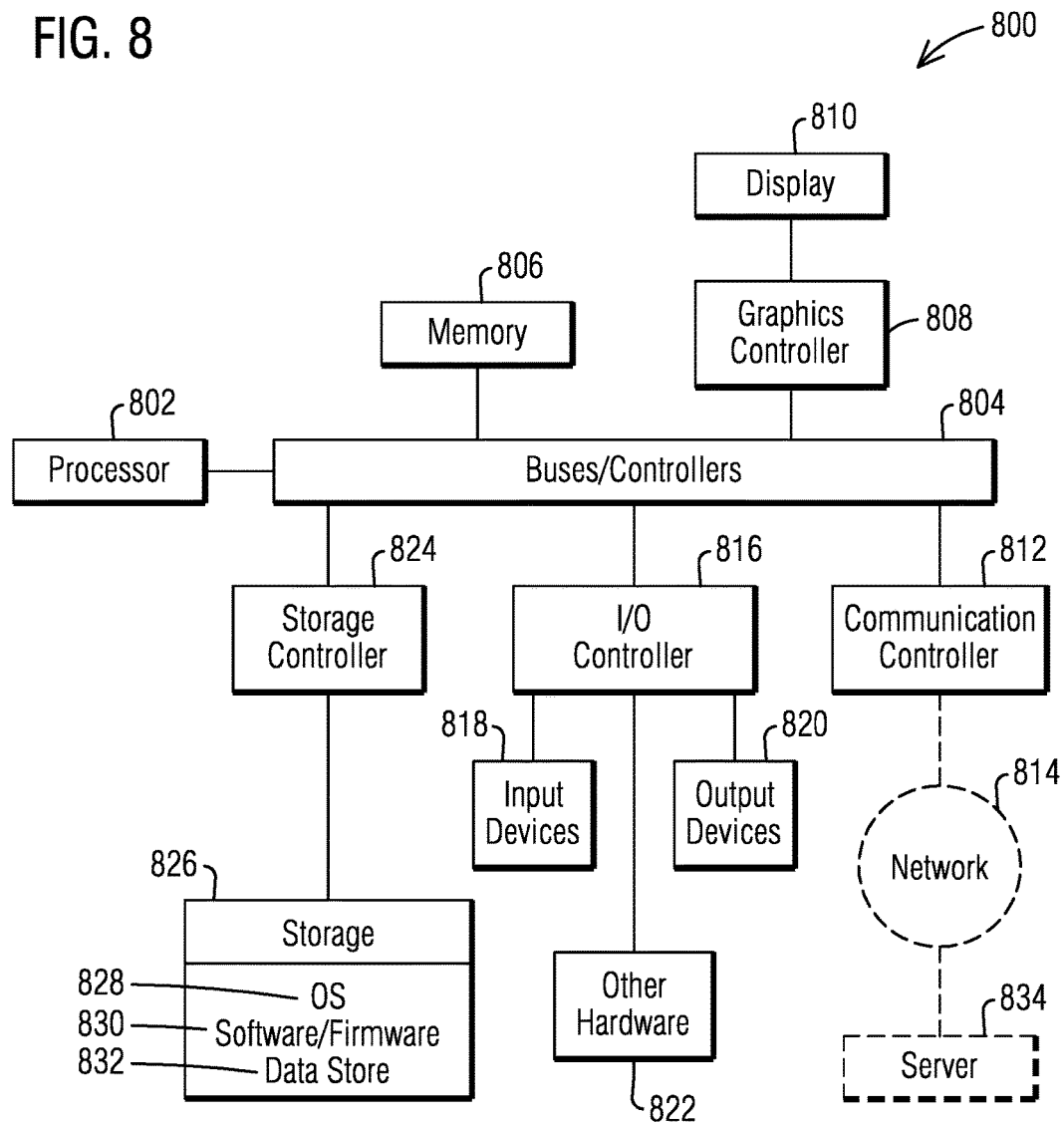
FIG. 8 illustrates a block diagram of a data processing system in which an embodiment may be implemented.

FIG. 8 illustrates a block diagram of a data processing system 800 (e.g., a computer or controller) in which an embodiment can be implemented for some types of the devices described herein and/or other system operatively configured by computer/processor executable instructions, circuits, or otherwise to perform the functions and processes as described herein. The data processing system depicted includes at least one processor 802 (e.g., a CPU) that may be connected to one or more bridges/controllers/buses 804 (e.g., a north bridge, a south bridge). One of the buses 804, for example, may include one or more I/O buses such as a PCI Express bus. Also connected to various buses in the depicted example may include a main memory 806 (RAM) and a graphics controller 808. The graphics controller 808 may be connected to one or more display devices 810 (e.g., LCD or AMOLED display screen, monitor, VR headset, and/or projector). It should also be noted that the processor 802 may include a CPU cache memory. Further, in some embodiments one or more controllers (e.g., graphics, south bridge) may be integrated with the CPU (on the same chip or die). Examples of CPU architectures include IA-32, x86-64, and ARM processor architectures.

Other peripherals connected to one or more buses may include communication controllers 812 (Ethernet controllers, WiFi controllers, cellular controllers) operative to connect to a local area network (LAN), Wide Area Network (WAN), a cellular network, and/or other wired or wireless networks 814 or communication equipment.

Further components connected to various busses may include one or more I/O controllers 816 such as USB controllers, Bluetooth controllers, and/or dedicated audio controllers (connected to speakers and/or microphones). It should also be appreciated that various peripherals may be connected to the I/O controller(s) (via various ports and connections) including input devices 818 (e.g., keyboard, mouse, pointer, touch screen, touch pad, drawing tablet, trackball, buttons, keypad, game controller, gamepad, camera, microphone, scanners, motion sensing devices that capture motion gestures), output devices 820 (e.g., printers, speakers) or any other type of device that is operative to provide inputs to or receive outputs from the data processing system.

Also, it should be appreciated that many devices referred to as input devices or output devices may both provide inputs and receive outputs of communications with the data processing system. For example, the processor 802 may be integrated into a housing (such as a tablet) that includes a touch screen that serves as both an input and display device. Further, it should be appreciated that some input devices (such as a laptop) may include a plurality of different types of input devices (e.g., touch screen, touch pad, and keyboard). Also, it should be appreciated that other peripheral hardware 822 connected to the I/O controllers 816 may include any type of device, machine, or component that is configured to communicate with a data processing system.

Additional components connected to various busses may include one or more storage controllers 824 (e.g., SATA). A storage controller may be connected to a storage device 826 such as one or more storage drives and/or any associated removable media, which can be any suitable non-transitory machine usable or machine readable storage medium. Examples, include nonvolatile devices, volatile devices, read only devices, writable devices, ROMs, EPROMs, magnetic tape storage, hard disk drives, solid-state drives (SSDs), flash memory, optical disk drives (CDs, DVDs, Blu-ray), and other known optical, electrical, or magnetic storage devices drives and/or computer media. Also in some examples, a storage device such as an SSD may be connected directly to an I/O bus 804 such as a PCI Express bus.

A data processing system in accordance with an embodiment of the present disclosure may include an operating system 828, software/firmware 830, and data stores 832 (that may be stored on a storage device 826 and/or the memory 806). Such an operating system may employ a command line interface (CLI) shell and/or a graphical user interface (GUI) shell. The GUI shell permits multiple display windows to be presented in the graphical user interface simultaneously, with each display window providing an interface to a different application or to a different instance of the same application. A cursor or pointer in the graphical user interface may be manipulated by a user through a pointing device such as a mouse or touch screen. The position of the cursor/pointer may be changed and/or an event, such as clicking a mouse button or touching a touch screen, may be generated to actuate a desired response. Examples of operating systems that may be used in a data processing system may include Microsoft Windows, Linux, UNIX, iOS, and Android operating systems. Also, examples of data stores include data files, data tables, relational database (e.g., Oracle, Microsoft SQL Server), database servers, or any other structure and/or device that is capable of storing data, which is retrievable by a processor.

The communication controllers 812 may be connected to the network 814 (which may or may not be a part of a data processing system 800), which can be any local, wide area, remote, private, and/or public data processing system network or combination of networks, as known to those of skill in the art, including the Internet. Data processing system 800 can communicate over the network 814 with one or more other data processing systems such as a server 834 (which may in combination correspond to a larger data processing system). For example, a larger data processing system may correspond to a plurality of smaller data processing systems implemented as part of a distributed system in which processors associated with several smaller data processing systems may be in communication by way of one or more network connections and may collectively perform tasks described as being performed by a single larger data processing system. Thus, it is to be understood that when referring to a data processing system, such a system may be implemented across several data processing systems organized in a distributed system in communication with each other via a network.

It should also be understood that the term "controller" means any device, system or part thereof that controls at least one operation, whether such a device is implemented in hardware, firmware, software or any combination thereof. It should be noted that the functionality associated with any particular controller may be centralized or distributed, whether locally or remotely. The described processor and memory may be included in a controller. Further, a controller may correspond to the described data processing system or any other hardware circuit that is operative to control at least one operation.

In addition, it should be appreciated that data processing systems may include virtual machines in a virtual machine architecture or cloud environment. For example, the processor 802 and associated components may correspond to the combination of one or more virtual machine processors of a virtual machine operating in one or more physical processors of a physical data processing system. Examples of virtual machine architectures include VMware ESCi, Microsoft Hyper-V, Xen, and KVM.

Those of ordinary skill in the art will appreciate that the hardware depicted for the data processing system may vary for particular implementations. For example, the data processing system 800 in this example may correspond to a controller, computer, workstation, server, PC, notebook computer, tablet, mobile phone, and/or any other type of apparatus/system that is operative to process data and carry out functionality and features described herein associated with the operation of a data processing system, computer, processor, software components, and/or a controller discussed herein. The depicted example is provided for the purpose of explanation only and is not meant to imply architectural limitations with respect to the present disclosure.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of the data processing system 800 may conform to any of the various current implementations and practices known in the art.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

Also, it should be understood that the words or phrases used herein should be construed broadly, unless expressly limited in some examples. For example, the terms "include" and "comprise," as well as derivatives thereof, mean inclusion without limitation. The singular forms "a", "an" and "the" are intended to include the plural forms as well, unless the context clearly indicates otherwise. Further, the term "and/or" as used herein refers to and encompasses any and all possible combinations of one or more of the associated listed items. The term "or" is inclusive, meaning and/or, unless the context clearly indicates otherwise. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Also, although the terms "first", "second", "third" and so forth may be used herein to refer to various elements, information, functions, or acts, these elements, information, functions, or acts should not be limited by these terms. Rather these numeral adjectives are used to distinguish different elements, information, functions or acts from each other. For example, a first element, information, function, or act could be termed a second element, information, function, or act, and, similarly, a second element, information, function, or act could be termed a first element, information, function, or act, without departing from the scope of the present disclosure.

In addition, the term "adjacent to" may mean: that an element is relatively near to but not in contact with a further element; or that the element is in contact with the further portion, unless the context clearly indicates otherwise. Further, the phrase "based on" is intended to mean "based, at least in part, on" unless explicitly stated otherwise.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, act, or function is an essential element, which must be included in the claim scope: the scope of patented subject matter is defined only by the allowed claims. Moreover, none of these claims are intended to invoke a means plus function claim construction unless the exact words "means for" are followed by a participle.

What is claimed is:

1. A system for stabilizing a BACnet MSTP network when failures occur comprising:
at least one processor in an MSTP device configured via executable instructions included in at least one memory to communicate data expecting reply (DER) messages for field devices onto an MSTP network for receipt by at least one IP device on an Ethernet network connected to the MSTP network via a BACnet IP/MSTP router, wherein the at least one processor is configured to:
determine when the at least one IP device sent a DER message has become a non-communicative device;
send a Poll for Master (PFM) message to the determined non-communicative device; and
drop further DER messages to the determined non-communicative device responsive to an absence of receipt of a response to the PFM message.

2. The system according to claim 1, wherein the at least one processor is configured to:
determine that a first DER message has not received a corresponding reply communication from a MAC address associated with the at least one IP device; and
responsive to receiving a second DER message for the same MAC address, send the PFM message.

3. The system according to claim 2, wherein the at least one processor is configured to:

responsive to receiving a third DER message for the same MAC address after the PFM message was sent, drop the third DER message without sending a PFM message.

4. The system according to claim 3, wherein the executable instructions include an MSTP state machine.

5. The system according to claim 2, further comprising:
a plurality of the MSTP devices, each connected to the MSTP network and respective field devices;
the MSTP network;
the at least one IP device having the MAC address;
the Ethernet network; and
the BACnet IP/MSTP router.

6. The system according to claim 5, wherein the field devices correspond to at least one of HVAC, lighting, and/or shading equipment.

7. The system according to claim 1, wherein the at least one processor is configured to simulate transmittal of the dropped messages, determine when communications are restored to the at least one IP device, and communicate DER messages to the IP device when communications are determined to be restored to the at least one IP device.

8. A method for stabilizing a BACnet MSTP network when failures occur comprising:
through operation of at least one processor in an MSTP device configured via executable instructions included in at least one memory to communicate data expecting reply (DER) messages for field devices onto an MSTP network for receipt by at least one IP device on an Ethernet network connected to the MSTP network via a BACnet IP/MSTP router:
determining that the at least one IP device sent a DER message has become a non-communicative device;
sending a Poll for Master (PFM) message to the determined non-communicative device; and
dropping further DER messages to the determined non-communicative device responsive to an absence of receipt of a response to the PFM message.

9. The method according to claim 8, further comprising through operation of the at least one processor:
determining that a first DER message has not received a corresponding reply communication from a MAC address associated with the at least one IP device; and
responsive to receiving a second DER message for the same MAC address, sending the PFM message.

10. The method according to claim 9, further comprising through operation of the at least one processor:
responsive to receiving a third DER message for the same MAC address after the PFM message was sent, dropping the third DER message without sending a PFM message.

11. The method according to claim 10, wherein the executable instructions include an MSTP state machine.

12. The method according to claim 10, carried out by a plurality of MSTP devices connected to respective field devices and connected to a common MSTP network connected via the BACnet IP/MSTP router to the at least one IP device having the MAC address on the Ethernet network.

13. The method according to claim 12, wherein the field devices correspond to at least one of HVAC, lighting, and/or shading equipment, further comprising controlling the field devices responsive to communications received through the MSTP network.

14. The method according to claim 8, further comprising through operation of the at least one processor:
simulating transmittal of the dropped messages;
determining when communications are restored to the at least one IP device; and
communicating DER messages to the IP device when communications are determined to be restored to the at least one IP device.

15. A non-transitory computer readable medium encoded with processor executable instructions that when executed by at least one processor in an MSTP device configured to communicate data expecting reply (DER) messages for field devices onto an MSTP network for receipt by at least one IP device on an Ethernet network connected to the MSTP network via a BACnet IP/MSTP router, cause the at least one processor to carry out a method for stabilizing a BACnet MSTP network when failures occur comprising:
determining that the at least one IP device sent a DER message has become a non-communicative device;
sending a Poll for Master (PFM) message to the determined non-communicative device; and
dropping further DER messages to the determined non-communicative device responsive to an absence of receipt of a response to the PFM message.

16. The non-transitory computer readable medium according to claim 15, further comprising:
determining that a first DER message has not received a corresponding reply communication from a MAC address associated with the at least one IP device; and
responsive to receiving a second DER message for the same MAC address, sending the PFM message.

17. The non-transitory computer readable medium according to claim 16, further comprising:
responsive to receiving a third DER message for the same MAC address after the PFM message was sent, dropping the third DER message without sending a PFM message.

18. The non-transitory computer readable medium according to claim 17, wherein the executable instructions include an MSTP state machine.

19. The non-transitory computer readable medium according to claim 17, wherein the field devices correspond to at least one of HVAC, lighting, and/or shading equipment, further comprising controlling the field devices responsive to communications received through the MSTP network.

20. The non-transitory computer readable medium according to claim 15, further comprising:
simulating transmittal of the dropped messages;
determining when communications are restored to the at least one IP device; and
communicating DER messages to the IP device when communications are determined to be restored to the at least one IP device.

* * * * *